W. L. BLISS.
DYNAMO SUPPORT.
APPLICATION FILED DEC. 26, 1908.

1,193,226.

Patented Aug. 1, 1916.
2 SHEETS—SHEET 1.

Witnesses:
Robert H. Weir
Frank H. Hubbard

Inventor:
William L. Bliss
By Edwin B. H. Tower Jr.
Atty.

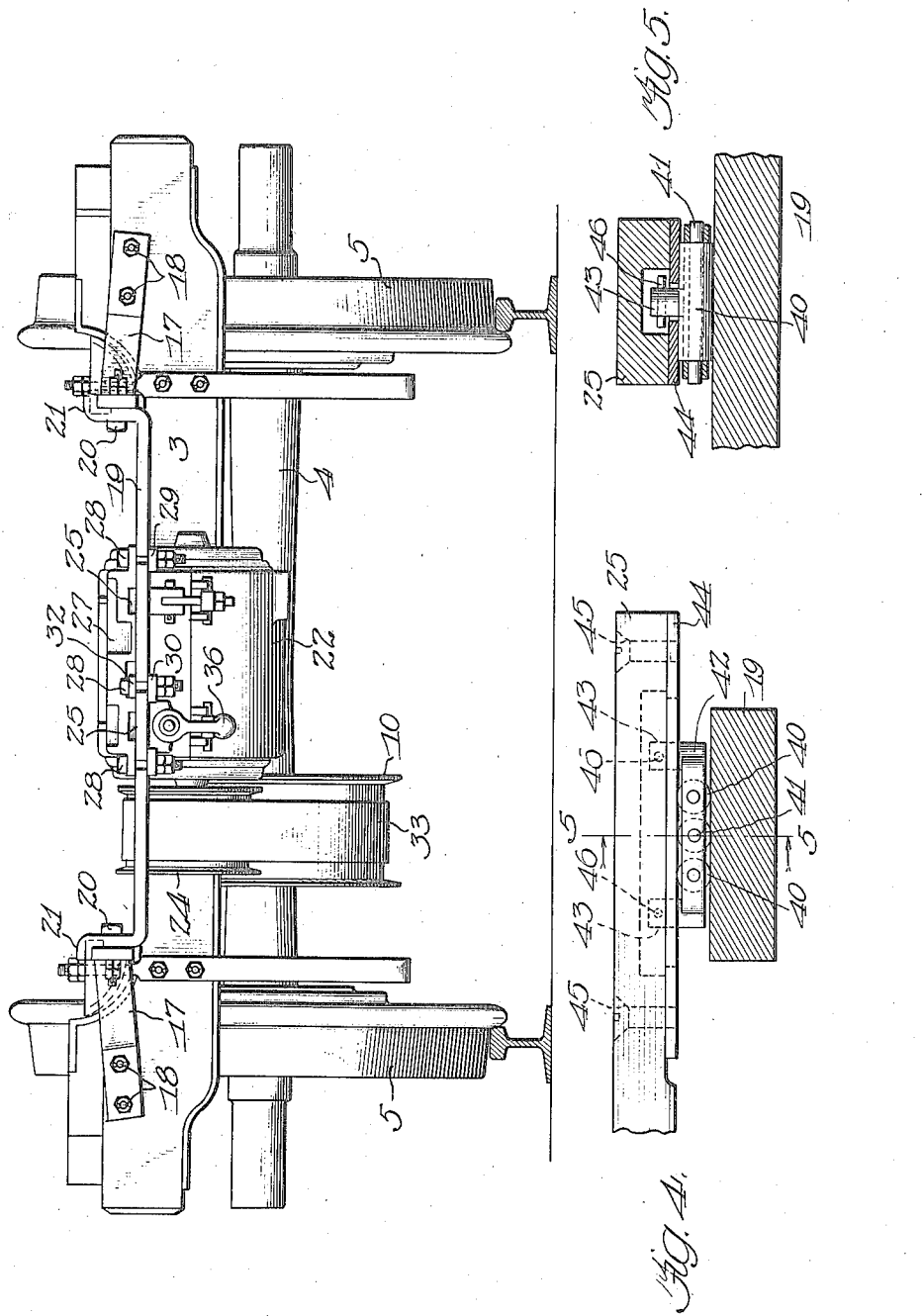

UNITED STATES PATENT OFFICE.

WILLIAM L. BLISS, OF BROOKLYN, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

DYNAMO-SUPPORT.

1,193,226.      Specification of Letters Patent.      Patented Aug. 1, 1916.

Application filed December 26, 1908. Serial No. 469,417.

*To all whom it may concern:*

Be it known that I, WILLIAM L. BLISS, a citizen of the United States, residing at Brooklyn, in the county of Kings and State of New York, have invented new and useful Improvements in Dynamo-Supports, of which the following is a full, clear, concise, and exact description, reference being had to the accompanying drawing, forming a part of this specification.

My invention relates to improvements in supports for axle driven generators, and more particularly to supporting means which permit adjustment of the generator to different positions.

In car lighting systems where it is desired to mount the generator for supplying current upon the car truck, it is necessary to provide means whereby the generator may be readily installed without altering or mutilating the structure of the truck. Furthermore, where it is desired to drive the generator from the car axle by means of a belt, it is often desirable that the generator be so supported that the same may be adjusted back and forth or transversely with respect to the car truck to bring the pulley on its armature shaft in line with the pulley on the car axle. It is also often desirable to provide means for adjusting the generator so as to bring its armature shaft into parallel relation with the car axle.

It is the object of my invention to provide a practical means whereby the generator may be readily mounted on a car truck without damage to the truck and then adjusted as above described.

A further object of my invention is to provide means whereby, when the generator is once adjusted, it may be moved toward or away from the car axle without disturbing the parallel relation of its armature shaft thereto. This enables the tension of the belt to be properly regulated.

A still further object of my invention is to so mount the generator that the same will be readily accessible.

Other objects and advantages of my invention will be hereinafter set forth.

For the purpose of more fully disclosing the nature of my invention, I shall describe the embodiment thereof, illustrated in the accompanying drawing.

Of course my invention is susceptible of various modifications.

Figure 1:
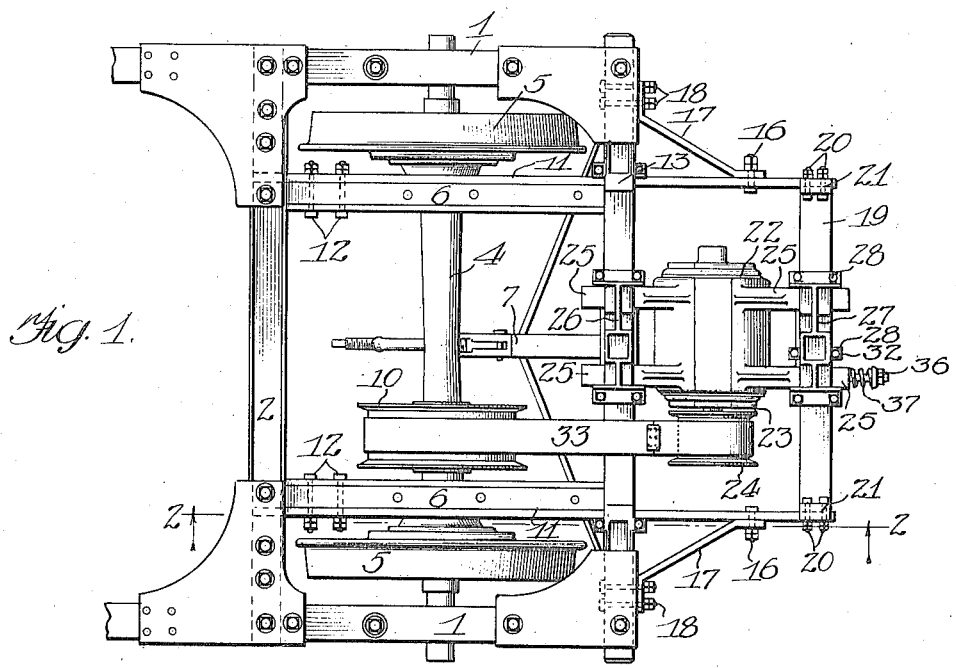
Figure 2:
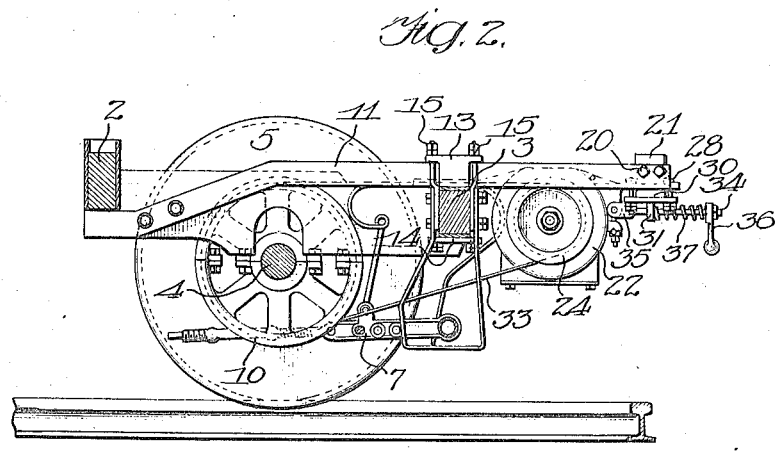

Figure 1 is a plan view of a car truck having a generator mounted thereon in accordance with my invention. Fig. 2 is a longitudinal sectional view taken on line 2—2, Fig. 1; Fig. 3 is an enlarged front elevation of Fig. 1, and Figs. 4 and 5 are enlarged detail views of a modification of my invention.

The car truck which I have illustrated is of a conventional type. Briefly described, the truck comprises wheel beams 1, which are suitably secured at one end to the transom 2, and at their other end to the end sill 3. Rigidly mounted on the car axle 4 are wheels 5, which are arranged between the wheel beams 1 and the wheel guards 6. The brake mechanism 7 is only illustrated to show that the same is in no wise interfered with by mounting a generator on the truck in accordance with my invention. Suitably mounted on the car axle 4 is a pulley 10, of any desired construction.

I shall now describe the parts which pertain to my invention.

Suitably secured to the wheel guards 6, and preferably on the outside thereof, are a pair of suspension bars 11. These bars are preferably of the shape illustrated in Fig. 2, so that one end of each will engage the underside of the transom 2, while their opposite ends will rest upon the top of, and project an equal distance beyond, the end sill 3. While the bars 11 may be secured to the wheel guards in any suitable manner, for the purpose of illustration I have shown the same secured thereto by bolts 12. Each of the suspension bars 11 is secured to the end sill 3 by clamp-plates 13 and 14, adapted to be drawn together by bolts 15. Adjacent to their ends the suspension bars are secured by bolts 16 to angle braces 17, which are secured by bolts 18 to the end sill. With this arrangement the suspension bars are finally secured in place on the truck. The ends of the suspension bars 11 are connected by a cross-bar 19, which is secured thereto by bolts 20. As shown in Fig. 3, the cross-bar 19 is provided at its ends with substantially right angle extensions 21, parts of which rest on the top of the suspension bars, thus taking the strain off of the securing bolts 20. Inclosed within the casing 22 is a generator, of any suitable type, provided with an armature shaft 23, upon which is rigidly mounted a pulley 24. The generator casing 22 is provided with a plurality of lugs or arms 25, which are preferably formed integrally therewith and disposed at right angles to the armature shaft 23. In the form illustrated these supporting lugs project in opposite directions from the upper part of the generator casing. It is apparent that they need not be integrally constructed and, furthermore, they may, of course, project from other portions of the generator casing. The arms or lugs 25 are adapted to rest on suitable supporting members, for example, on the cross-bar 19 and the end sill 3, thereby supporting the generator between the same and making use of the said end sill as a cross-bar. I do not limit myself, however, to the use of said end sill as one of the supporting members, as other supporting members may be provided. Arranged on the end sill 3 and the cross-bar 19 are guides 26 and 27, respectively, for the lugs 25 on the generator casing.

The cross-bar guide 27 comprises a plate or frame, preferably formed of cast iron or steel and having transversely extending grooves formed therein for receiving the arms or lugs 25 of the generator casing, which bear on the cross-bar. Passing through one end of the guide 27, on opposite sides of the cross-bar, are bolts 28 which also pass through the ends of a plate 29 arranged to engage the underside of the cross-bar. Passing through the opposite end of the guide 27, on opposite sides of the cross-bar, is another pair of bolts 28 which pass through a bracket 30 arranged to bear against the underside of the cross-bar. The bracket 30 is preferably of the shape shown in Fig. 3, being provided with a downwardly extending portion 31, the function of which will be hereinafter set forth. The opposite end of the bracket 30 is supported by another pair of bolts 28, which pass through a supporting plate or bar 32 arranged on the upper side of the cross-bar. The guide 27 is preferably recessed to receive the plate 32. With this arrangement, by tightening the nuts on the bolts 28, the guide 27 may be securely clamped to the cross-bar 19, thus firmly holding the lugs 25 of the generator casing against lateral movement. On the other hand, by loosening the nuts on the bolts 28, the guide 27 is loosened and may be slid longitudinally of the cross-bar into any desired position. The end sill guide 26 is of substantially the same construction as the guide 27, and may be clamped to the other cross bar or end sill or slid longitudinally thereon in the same manner as the guide 27. Accordingly, the generator may be moved back and forth along its cross-bars or supporting members through a wide range and clamped in any desired position of adjustment. The purpose of this arrangement is to enable the generator to be adjusted to bring the pulley 24 in line with the pulley on the car axle, and to permit a slight skewing of the generator if necessary, to render the armature shaft 23 parallel to the car axle. While the guides 26 and 27, when clamped in the desired position, prevent any lateral movement of the lugs 25 of the generator casing, yet said lugs are free to move longitudinally in the guides. Inasmuch, however, as the lugs 25 extend at right angles to the armature shaft 24, it is obvious that after the generator has once been adjusted to render its armature shaft parallel to the car axle, the same may be moved back and forth in the plane of its supports and between the cross-bar 19 and the end sill without danger of disturbing the relationship between armature shaft and car axle. By moving the generator transversely of its armature shaft, in the manner just described, or in other words, longitudinally with respect to the car truck, the tension on the belt 33 may be regulated as desired. For maintaining the desired tension on the belt 33, I provide a tension device comprising a bolt 34 having its head secured in a clevis 35 which is pivoted to a lug provided on the generator casing. The bolt 34 passes through the portion 31 of the bracket 30 and is provided at its end with a tension nut 36. Interposed between the bracket 30 and the tension nut 36 is a tension spring 37. By turning the tension nut 37 in one direction or the other, the tension of the belt may be regulated as desired. This construction provides for an adjustment of the generator laterally and also at right angles to the lateral direction, but always in the same horizontal plane with respect to the car truck, so that the relation between the armature pulley and the axle pulley is maintained with only the variation in relative position necessary to accomplish the adjustment. The rigidly mounted frame on which the generator is supported reduces to a minimum the parts which are liable to wear in service.

In practice I prefer to interpose anti-friction rollers between the lugs and the supporting members to facilitate the movement of the generator to regulate the belt tension. Such an arrangement is shown in Figs. 4 and 5. Fig. 4 merely shows one lug 25 of the generator casing and the cross-bar 19 with anti-friction rollers 40 interposed between the same, said rollers being disposed at right angles to the cross-bar. In practice I prefer to mount the rollers on spindles or pins 41, secured in a frame or cage 42. The cage 42 may be of any suitable construction. As shown, it is rectangular and provided at opposite ends with upwardly projecting pins or lugs 43. The rollers 40 are adapted to bear directly on the cross-bar. Interposed between the rollers and the lug 25 of the generator casing, is a bearing plate 44 which is secured to said lug by screws 45. The pins 43 of the roller cage 42 pass through a longitudinal slot provided in the plate 44, and project into a longitudinally extending recess provided in the underside of the supporting lug 25. This arrangement prevents displacement of the roller cage, but at the same time allows movement thereof relatively to the generator lug 25. In practice I prefer to make the recess in the lug 25 slightly longer and wider than the slot in the plate 44. For preventing detachment of the roller cage from the lug 25 I provide locking pins 46, passing through lugs 43 of the roller cage at right angles to the slot in the plate 44. These antifriction devices may be applied to all the generator lugs.

I do not desire to limit myself to the details described but desire to cover suitable equivalent means for accomplishing the desired result whenever such means fall within the scope of the appended claims.

What I claim as new and desire to secure by Letters Patent, is:

1. The combination with a belt driven dynamo, of supporting means therefor, guides secured to said supporting means, said guides and said dynamo having coöperating parts permitting free bodily movement of said dynamo with respect to said guides in a direction at right angles to the armature shaft of said dynamo, but said parts preventing movement of said dynamo in other directions, and a tension device opposing the movement of said dynamo with respect to said guides.

2. The combination with a dynamo, of supporting means therefor, guides on said supporting means and means on the generator coöperating with said guides for preventing movement of said dynamo, except in a direction at right angles to its armature shaft, said guides being adjustable on said supporting means in a direction substantially parallel to said armature shaft.

3. The combination with a pair of substantially parallel supporting members, of a generator supported thereby, and means for securing said generator to said bars, said means permitting movement of said generator in a direction at right angles to its armature shaft and to said bars.

4. The combination with a pair of substantially parallel supporting bars, of a belt-driven dynamo supported thereby, means on said bars for securing said dynamo thereto, said means also being adjustable to permit proper alinement of the belt pulleys and permitting movement of said generator in a direction at right angles to its armature shaft.

5. The combination with a pair of substantially parallel supporting bars, of a dynamo supported thereon and having its armature shaft arranged parallel to said bars, means for securing said dynamo to said bars, said means permitting said dynamo to be moved in a direction at right angles to the armature shaft.

6. The combination with a pair of substantially parallel supporting bars, of a dynamo supported thereby, and means for securing said dynamo to said bars and permitting said dynamo to be adjusted to render its armature shaft substantially parallel to said bars, said means also permitting said dynamo to move in a direction at right angles to its armature shaft.

7. The combination with a dynamo having a casing provided with outwardly extending lugs, of means arranged to be engaged by said lugs for supporting said dynamo, said means being provided with guides for preventing lateral movement of said lugs while permitting longitudinal movement thereof.

8. The combination with a dynamo having a casing provided with a plurality of outwardly extending lugs disposed at right angles to the armature shaft of said dynamo, of means adapted to be engaged by said lugs for supporting said dynamo, and guides adjustably mounted on said means, for preventing lateral movement of said lugs while permitting longitudinal movement thereof.

9. The combination with a dynamo having a casing provided on opposite sides with a plurality of lugs disposed at right angles to the armature shaft of said dynamo, of a pair of substantially parallel supporting bars adapted to be engaged by said lugs to support said dynamo, and guides mounted on said bars for preventing lateral movement of said lugs while permitting longitudinal movement thereof, said guides being adjustable longitudinally of said bars.

10. The combination with a dynamo having a casing provided on opposite sides with a plurality of lugs disposed at right angles to the armature shaft of said dynamo, of a pair of substantially parallel supporting bars adapted to be engaged by said lugs to suport said dynamo, of guides mounted on said bars for preventing lateral movement of said lugs while permitting longitudinal movement thereof, said guides being adjustable longitudinally of said bars, and means for clamping said guides to said bars.

11. The combination with a car truck, of a generator mounted thereon, said generator being adjustable longitudinally of the car axle and at right angles thereto and being maintained at all times in a single horizontal plane with respect to the car truck.

12. The combination with a car truck, of a generator mounted thereon and movable in a single plane, and adjustable guides mounted on said truck for preventing movement of said generator, except in a direction at right angles to its armature shaft.

13. The combination with a car truck, having supporting members, of a generator carried by said supporting members and movable in a single plane and guides mounted on said supporting members for preventing movement of said generator, except in a direction at right angles to the armature shaft thereof, said guides being adjustable longitudinally of the car axle.

14. The combination with a car truck, of a generator suspended therefrom and movable in a single plane, guides mounted on said truck for holding said generator in position to render its armature shaft parallel to the car axle, said guides permitting movement of said generator in a direction at right angles to its armature shaft, and means for rigidly securing said guides to said truck, said means permitting said guides to be adjusted longitudinally of the car axle.

15. The combination with a car truck having a pair of cross-bars arranged substantially parallel to the car axle, of a generator supported by said cross-bars rigidly supported with respect to said truck and, said generator being adjustable on said bars in a single plane, and means for securing said generator to said cross-bars.

16. The combination with a car truck having a pair of cross-bars arranged substantially parallel to the car axle, of a generator suspended from said cross-bars, and means for holding said generator in position to maintain its armature shaft parallel to the car axle, said means permitting movement of said generator in a direction at right angles to its armature shaft and preventing movement of said generator except in a single horizontal plane with respect to said car truck.

17. The combination with a car truck having a pair of cross-bars arranged substantially parallel to the car axle, of a generator suspended from said cross-bars, and means for securing said generator in position to render its armature shaft parallel to the car axle and to permit said generator to move in a direction at right angles to its armature shaft, said means being adjustable longitudinally of said bars said means preventing movement of said generator except in a single plane horizontal with respect to said car truck.

18. The combination with a car truck having a pair of cross-bars arranged substantially parallel to the car axle, of a generator having a casing provided with a plurality of lugs disposed at right angles to its armature shaft, said lugs being adapted to engage said cross-bars to support said generator, and guides on said bars for holding said generator in position to maintain its armature shaft parallel to the car axle and to permit said generator to be moved in a direction at right angles to its armature shaft.

19. The combination with a car truck having a pair of cross-bars arranged substantially parallel to the car axle, of a generator having a casing provided with a plurality of lugs disposed at right angles to its armature shaft, said lugs being adapted to engage said cross-bars to support said generator, and guides on said bars for holding said generator in position to render its armature shaft parallel to the car axle and to permit said generator to be moved in a direction at right angles to its armature shaft, said guides being adjustable longitudinally on said bars, and means for rigidly securing said guides to said bars.

20. The combination with a car truck, of a pair of substantially parallel bars secured thereto and projecting beyond the end sill of the truck, a cross-bar supported by said parallel bars and a generator casing, having portions resting upon the end sill of the truck and said cross-bar and adjustably secured thereto.

21. The combination with a car truck, of a pair of suspension bars secured thereto and projecting beyond the end sill of said truck, a transverse member rigidly supported by said bars, and a generator casing having portions directly supported by said transverse member and by another member and adjustable with respect to said members.

22. The combination with a car truck of a pair of suspension bars secured thereto and projecting beyond the end thereof, a transverse member rigidly supported by said bars, and a generator casing having projecting portions directly supported by said transverse member and by another member and adjustable along said members.

23. The combination with a car truck, of a pair of substantially parallel bars secured thereto and projecting beyond the end sill of the truck, a cross-bar rigidly supported by said parallel bars, and a generator supported in part by said cross-bar and in part by a member rigidly supported parallel thereto and adjustable longitudinally of said two supporting elements.

24. The combination with a car truck, of a pair of substantially parallel bars secured thereto and projecting beyond the end sill of the truck, a cross-bar rigidly supported by said parallel bars, and a generator supported in part by said cross-bar and in part by a member rigidly supported parallel thereto said generator being adjustable in any direction in the plane of its support.

25. In combination, a car truck, a supporting frame carried by said truck and including parallel suspension bars which project beyond the end thereof and generator supporting means rigidly supported by said bars, a generator driven by a belt connection from one of the car axles, said generator being associated with said supporting means and supported thereon in stable equilibrium, and means for adjusting said generator bodily with respect to said supporting means and longitudinal of said suspension bars to provide for belts of varying lengths.

26. The combination with a car axle, of a generator belted to said axle, said generator being supported by a frame which includes parallel suspension bars, said generator being provided with supporting means on both sides thereof, said means on the side away from said axle being supported by said suspension bars and additional means coöperating with the supporting means on each side of said generator permitting movement of all of the said supporting means toward or away from said axle, whereby said generator is also moved bodily in the same directions.

27. The combination with a car truck, of a pair of substantially parallel bars secured thereto and projecting beyond the end sill of the car, a cross-bar supported by said parallel bars, a generator having a casing provided with outwardly extending lugs adapted to rest upon the end sill of the truck and said cross-bar to support said generator, and means for securing said generator in position.

28. The combination with a car truck, of a pair of substantially parallel bars secured thereto and projecting beyond the end sill of the car, a cross-bar supported by said parallel bars, a generator having a casing provided with outwardly extending lugs adapted to rest upon the end sill of the truck and said cross-bar to support said generator, and means for securing said generator in position, guides on said cross-bar and said end sill for securing said lugs thereto, but permitting longitudinal movement of said lugs, said guides being movable longitudinally of said cross-bar and said end sill, and means for clamping said guides in place.

29. The combination with a dynamo, of a plurality of supporting means therefor, and anti-friction rollers interposed between said dynamo and each of said supporting means whereby adjustment of said dynamo relative to its support is facilitated.

30. The combination with a dynamo, of supporting means therefor, guides on said supporting means for preventing movement of said dynamo, except in one direction, and anti-friction rollers interposed between said dynamo and said supporting means.

31. The combination with a pair of substantially parallel supporting bars, of a dynamo supported thereby, said dynamo having projecting arms adapted to bear on said supporting bars, and anti-friction rollers interposed between said arms and said supporting bars.

32. The combination with a pair of substantially parallel supporting bars, of a dynamo supported thereby, said dynamo having projecting arms bearing upon said bars, guides on said bars for preventing movement of said arms in but one direction, anti-friction rollers interposed between said arms and said bars, and a cage for said rollers.

33. The combination with a pair of substantially parallel supporting bars, of a dynamo supported thereby, said dynamo having projecting arms bearing upon said bars, guides on said bars for preventing movement of said arms in but one direction, anti-friction rollers interposed between said arms and said bars, a cage for said rollers and means for limiting the range of movement of said cage.

34. The combination with a dynamo casing having a projecting supporting arm, of a cage having anti-friction rollers mounted therein, said cage being secured to said arm and movable relatively thereto.

35. The combination with a dynamo casing having a projecting supporting arm provided on its underside with a longitudinally extending recess, of a slotted plate secured to the underside of said arm, the slot in said plate registering with the recess in said arm, a cage having anti-friction rollers mounted therein, said cage having projections thereon passing through the slot in said plate and extending into the recess in said arm, and pins passing through the projections on said cage transversely of said slot.

36. A generator suspension having substantially parallel transverse members on which a generator is slidably mounted and means for clamping said generator in any position of adjustment back and forth along said members said clamping means permitting adjustment of the generator in another direction relatively to said transverse bars.

37. A generator suspension having substantially parallel transverse members on which a generator is slidably mounted, means for clamping said generator in any position of adjustment back and forth along said members, and means for moving said generator in a direction at right angle to the longitudinal axis and independently of said transverse bars of said members to regulate the belt tension.

38. In combination, an axle driven car lighting generator, a rigidly mounted supporting frame therefor, said generator being slidably supported by said frame and adjustable with relation thereto, and independent clamping means for clamping said generator to said frame to prevent movement in a certain direction.

39. In combination, an axle driven car lighting generator, a rigidly mounted frame having longitudinal members and transverse members fixedly mounted with relation to each other, supporting means on said generator coöperating with said transverse members, said generator being adjustable both longitudinally and transversely with relation to said transverse members, and separable clamping means for clamping said generator to said transverse members to prevent movement in one of said directions.

40. The combination with a dynamo having a casing provided with a plurality of outwardly extending lugs disposed at right angles to the armature shaft of said dynamo, of means adapted to be engaged by said lugs for supporting said dynamo, and independent members adjustably mounted on said means for preventing lateral movement of said lugs but permitting free movement of said lugs with respect to said supporting means in a direction at right angles to said lateral movement.

41. The combination with a dynamo having a casing provided on opposite sides with a plurality of lugs disposed at right angles to the armature shaft of said dynamo, of a pair of substantially parallel supporting elements adapted to be engaged by said lugs to support said dynamo, and members mounted on said elements for preventing lateral movement of said lugs, said members being adjustable longitudinally of said elements said bars permitting free movement of said lugs with respect to said supporting elements in a direction at right angles to said lateral movement.

In witness whereof, I have hereunto subscribed my name in the presence of two witnesses.

WILLIAM L. BLISS.

Witnesses:
 FRANK H. HUBBARD,
 SHEPLES W. FITZ GERALD.